(12) United States Patent
Freese et al.

(10) Patent No.: US 11,669,921 B2
(45) Date of Patent: Jun. 6, 2023

(54) SYSTEMS AND METHODS FOR TRAVEL OPTIMIZATION

(71) Applicant: Included Health, Inc., San Francisco, CA (US)

(72) Inventors: Nathaniel Freese, San Francisco, CA (US); Jyotiwardhan Patil, San Francisco, CA (US); Ramakrishna Soma, San Francisco, CA (US); William Roller, San Francisco, CA (US); Eric Carlson, San Francisco, CA (US)

(73) Assignee: INCLUDED HEALTH, INC., San Francisco, CA (US)

( * ) Notice: Subject to any disclaimer, the term of this patent is extended or adjusted under 35 U.S.C. 154(b) by 0 days.

(21) Appl. No.: 17/124,275

(22) Filed: Dec. 16, 2020

(65) Prior Publication Data

US 2021/0182985 A1     Jun. 17, 2021

Related U.S. Application Data

(60) Provisional application No. 62/948,716, filed on Dec. 16, 2019.

(51) Int. Cl.
*G06Q 50/14* (2012.01)
*G06N 20/00* (2019.01)
*G06Q 30/0204* (2023.01)

(52) U.S. Cl.
CPC ............. *G06Q 50/14* (2013.01); *G06N 20/00* (2019.01); *G06Q 30/0205* (2013.01)

(58) Field of Classification Search
CPC ........... G06Q 10/00–50/00; G06N 3/00–20/00
USPC .................................................. 705/7.11–7.42
See application file for complete search history.

(56) References Cited

U.S. PATENT DOCUMENTS

| 8,612,134 | B2 * | 12/2013 | Zheng | G01S 19/14 |
| | | | | 705/7.34 |
| 9,691,026 | B1 * | 6/2017 | Freese | G06F 16/951 |
| 10,262,039 | B1 * | 4/2019 | Ramanathan | G06F 16/9537 |
| 10,600,105 | B1 * | 3/2020 | Kumar | G06Q 30/0637 |
| 10,832,170 | B2 * | 11/2020 | Freese | G06F 16/951 |
| 2011/0208425 | A1 * | 8/2011 | Zheng | G01S 19/14 |
| | | | | 706/46 |

(Continued)

*Primary Examiner* — Alan S Miller
(74) *Attorney, Agent, or Firm* — Finnegan, Henderson, Farabow, Garrett & Dunner, LLP (57) ABSTRACT

Methods, systems, and computer-readable media for generating a virtual based on location. The method acquires a request for a service based on a type of service and is associated with a user, the user's location, and user preferences. The method then acquires a set of service providers based on the type of service and the user's location who are filtered from a larger set of service providers using user preferences. The method in the next step acquires a machine learning model that is based on stored information associated with other users travel patterns and with service providers providing the service and the geographical information associated with the user's location. The method executed the identified machine learning model to aggregate a subset of service providers based on output from the machine learning model. The machine learning model is inputted the set of service providers, the user's location, the user's preferences, and the geographical information.

18 Claims, 8 Drawing Sheets

(56) References Cited

U.S. PATENT DOCUMENTS

| | | | | |
|---|---|---|---|---|
| 2014/0120944 A1* | 5/2014 | Tarkkala | ............ | G01C 21/3617 |
| | | | | 455/456.1 |
| 2017/0098184 A1* | 4/2017 | Marco | ................ | G06Q 30/0223 |
| 2017/0178081 A1* | 6/2017 | Goldstein | ........... | G06Q 10/1095 |
| 2018/0211337 A1* | 7/2018 | Ghaddar | ................ | G06Q 50/14 |
| 2019/0318412 A1* | 10/2019 | Constantinescu | ..... | H04L 67/306 |
| 2020/0104288 A1* | 4/2020 | Tao | ........................ | G06N 20/00 |

\* cited by examiner

SYSTEMS AND METHODS FOR TRAVEL OPTIMIZATION

CROSS-REFERENCE TO RELATED APPLICATIONS

This application claims priority to U.S. Provisional Application No. 62/948,716, filed on Dec. 16, 2019, the entirety of which is hereby incorporated by reference.

BACKGROUND

An ever increasing amount of data and data sources are now available to researchers, analysts, organizational entities, and others. This influx of information allows for sophisticated analysis but, at the same time, presents many new challenges for sifting through the available data and data sources to locate the most relevant and useful information. As the use of technology continues to increase, so, too, will the availability of new data sources and information.

Because of the abundant availability of data from a vast number of data sources, determining the optimal values and sources for use presents a complicated problem difficult to overcome. Accurately utilizing the available data can require both a team of individuals possessing extensive domain expertise as well as many months of work to create useful virtual networks of data detailing possible outcomes. The process can involve exhaustively searching existing literature, publications, and other available data to identify and study relevant data sources that are available both privately and publicly.

While this approach can often provide effective academic analysis, applying these types of analytical techniques to domains requiring accurate results obtainable only through time and resource intensive research is incompatible with the demands of modern applications. For example, the developed model may not line up with specific circumstances or individual considerations. In this scenario, applying the model requires extrapolation to fit the specific circumstances, diluting the effectiveness of the model, or requires spending valuable time and resources to modify the model. As a result, models developed in this way typically provide only generalized guidance insufficient for use in personalized settings. As more detailed and individualized data becomes available, demand for the ability to accurately discern relevant data points from the sea of available information, and efficiently apply that data across thousands of personalized scenarios increases.

SUMMARY

Certain embodiments of the present disclosure relate to a non-transitory computer readable medium, including instructions that when executed by one or more processors cause a system to perform a method for determining a virtual network based on a location, the method comprising: acquiring a request for a service, wherein the request is based on a type of service and is associated with a user, the user's location, and user preferences; acquiring a set of service providers based on the type of service and the user's location, wherein the set of service providers is filtered from a larger set of service using the user preferences; acquiring a machine learning model that is based on stored information associated with other users travel patterns and with service providers providing the service; acquiring geographical information associated with the user's location; and aggregating a subset of service providers based on output from the machine learning model that receives as input the set of service providers, the user's location, the user's preferences, and the geographical information.

Certain embodiments of the present disclosure relate to a method performed by a system for determining a virtual network based on a location, the method comprising: acquiring a request for a service, wherein the request is based on a type of service and is associated with a user, the user's location, and user preferences; acquiring a set of service providers based on the type of service and the user's location, wherein the set of service providers is filtered from a larger set of service using the user preferences; acquiring a machine learning model that is based on stored information associated with other users travel patterns and with service providers providing the service; acquiring geographical information associated with the user's location; and aggregating a subset of service providers based on output from the machine learning model that receives as input the set of service providers, the user's location, the user's preferences, and the geographical information.

Certain embodiments of the present disclosure relate to a system for determining a virtual network based on a location. The system includes one or more processors executing processor-executable instructions stored in one or more memory devices to perform a method, the method comprising: acquiring a request for a service, wherein the request is based on a type of service and is associated with a user, the user's location, and user preferences; acquiring a set of service providers based on the type of service and the user's location, wherein the set of service providers is filtered from a larger set of service using the user preferences; acquiring a machine learning model that is based on stored information associated with other users travel patterns and with service providers providing the service; acquiring geographical information associated with the user's location; and aggregating a subset of service providers based on output from the machine learning model that receives as input the set of service providers, the user's location, the user's preferences, and the geographical information.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for evaluating large numbers of data sources and vast amounts of data used in the creation of a predictive or analytical data model. These technologies can use information relevant to the specific domain and application of a data model to prioritize potential data sources. Further, the technologies and techniques herein can interpret the available data sources and data to extract probabilities and outcomes associated with the specific domain and application of the data model. The described technologies can synthesize the data into a coherent data model, that can be used to analyze and compare various paths or courses of action.

These technologies can efficiently evaluate data sources and data, prioritize their importance based on domain and circumstance specific needs, and provide effective and accurate predictions that can be used to evaluate potential courses of action. The technologies and methods allow for the application of data models to personalized circumstances. These methods and technologies allow for detailed evaluation that can improve decision making on a case by case basis.

Figure 1:
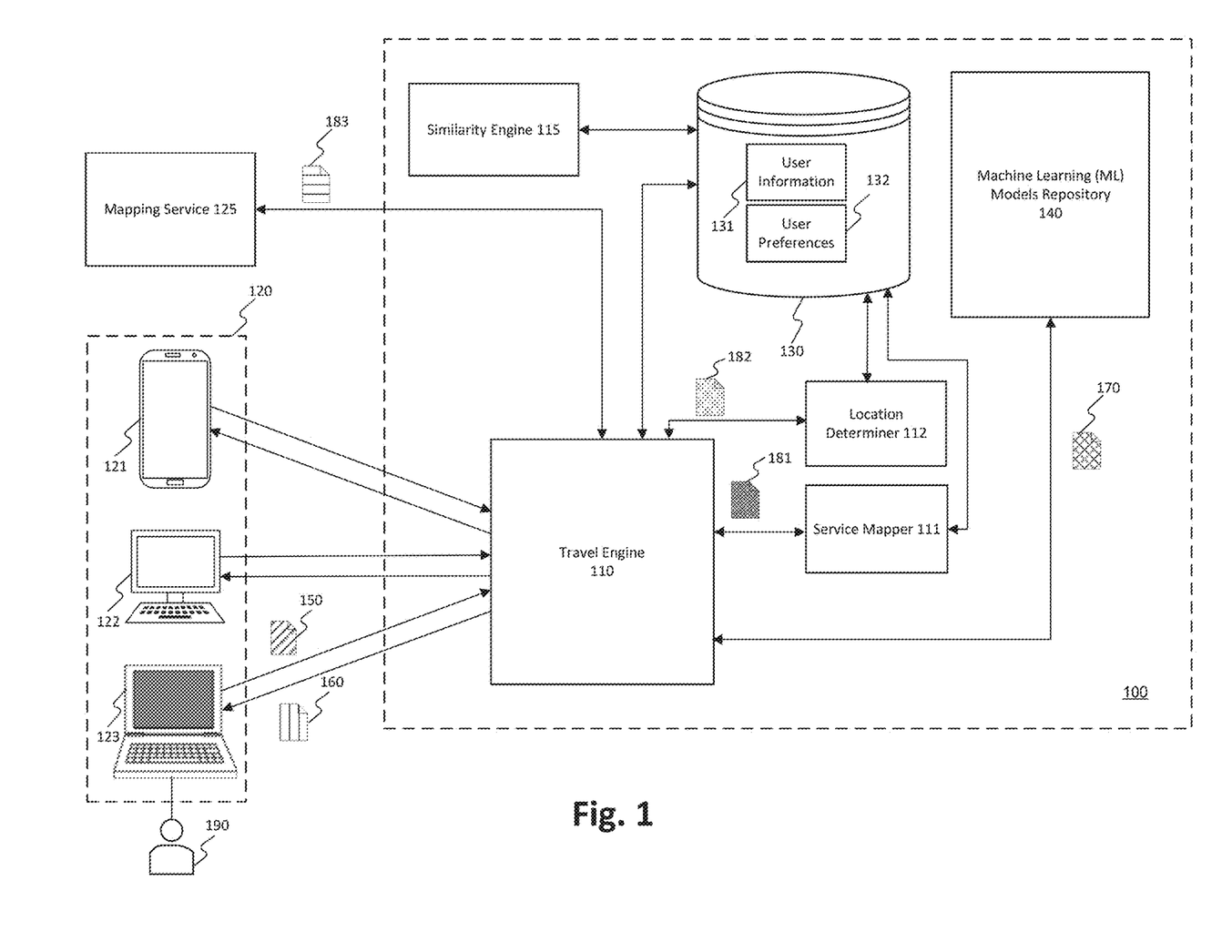
FIG. 1 is a block diagram showing various exemplary components of a travel optimization system for generating a virtual network, according to some embodiments of the present disclosure.

FIG. 1 is a block diagram showing various exemplary components of a travel optimization system 100 for generating a virtual network based on location, according to some embodiments of the present disclosure. Travel optimization system 100 comprises a travel engine 110 that may receive queries from users of devices 120, a database 130, and a machine learning models repository 140.

As illustrated in FIG. 1, devices 120 may comprise devices 121 (mobile device), 122 (desktop computer), and 123 (laptop). Users may communicate with the travel optimization system 100 using devices 120. For example, a user 190 of device 123 may send a query 150 to the travel optimization system 100. The query 150 received by the travel optimization system 100 may result in travel engine 110 generating a virtual network 160.

After receiving the query 150, the travel optimization system 100 may direct travel engine 110 to convert the query 150 to a service request 170 in order to generate the virtual network 160. In some embodiments, the query 150 sent by devices 120 may include a service request. Travel engine 110 may add additional service requests to a service request already present in query 150.

The travel optimization system 100 may also include a database 130 to help determine an appropriate service request (e.g., the service request 170). Database 130 may include additional information helpful in the generation of the service request 170. The additional information may help determine the context of query 150 and generate the appropriate service request 170. The additional information may include historical information on the usage of the travel optimization system 100 or service providers by user 190. As shown in FIG. 1, additional information can include user information 131 and user preferences 132. The user preferences 132 may be the information supplied by users themselves, and the user information 131 may include information about a user determined from past usage of the travel optimization system 100.

The travel engine 110 may append additional information about the user from database 130 to the service request 170 supplied to a Machine Learning (ML) models repository 140 in order to generate a virtual network 160. The additional information may aid in filtering results generated upon executing ML models in ML models repository 140 for the service request 170.

Travel engine 110, upon receiving the query 150, may determine the user of the query from the database 130 to identify the relevant user details from database records containing user information 131 and user preferences 132. The past usage of travel optimization system 100 present in user information 131 may be generated from the user interaction with previously generated virtual networks. The user information 131 may also include information about the previous queries sent to the travel optimization system 100.

The user preferences 132 may be supplied as part of query 150. The user preferences 132 may be updated at regular intervals. The update to the user preferences 132 may be supplied directly by a user (e.g., the user 190) through a query (e.g., the query 150). In some embodiments, the user preferences 132 may be determined automatically based on the usage of the travel optimization system 100 by a user (e.g., the user 190). For example, the user preferences 132 may be updated based on the interactions with virtual networks generated for past queries to the travel optimization system 100. In some embodiments, only a subset of user preferences 132 may be overridden with new values. The user preferences 132 may have a default set of values, and they may vary by user.

The travel optimization service mapper 111 and location determiner 112 provide additional information determined from the query 150 to be included in the service request 170. In some embodiments, service mapper 111 and location determiner 112 may communicate with database 130 to generate the additional information to be included in the service request 170.

Service mapper 111 may determine a service that may resolve the query 150 presented by the user 190. In some embodiments, service mapper 111 may access the user information 131 and user preferences 132 to correctly predict the type of service that may resolve the query 150 shared by the user 190. The service mapper 111 upon determining the type of service 181 sends it to the travel engine 110.

The location determiner 112 helps determine the location details preferred by the user 190 in resolving the query 150. The location details may be identified from certain preferences set in user preferences 132 by user 190. In some embodiments, the location determiner 112 may need to parse the past queries in user information 131 to determine the preferred location. The location may also be provided by the user 190 explicitly as part of the query 150 or identified from the GPS location of the device 123. Location determiner 112 upon determining the preferred location 182 sends it to the travel engine 110.

Travel engine 110 may also communicate with an external mapping service 125 to determine the geographical information 183 associated with the location 182 identified by the location determiner 112. The geographical information may include landmarks and travel paths within location 182. The travel engine 110 may communicate with the mapping service 125 to generate the travel penalty values to associate with the virtual network 160.

The travel optimization system 100 may include Machine Learning (ML) models repository 140 to make a predictive analysis of the generated service request 170. The service request 170 may be prepared by travel engine 110 with the help of user information 131 and user preferences 132 of user database 130 and the type of service 181 and location 182 determined by service mapper 111 and location determiner 112, respectively. The travel engine 110 may send a service request 170 to ML models repository 140 to generate a virtual network (e.g., the virtual network 160). The service request 170 may be used by ML models repository 140 to determine ML models relevant to respond to the query 150 sent by the user 190. The ML models repository 140 may include models for different factors in determining the virtual network 160 and may be determined using the service request 170. The factors may include the type of service, location and other details provided by travel engine 110 in the service request 170. In some embodiments, the travel engine 110 may use a set of ML models in the ML models repository 140 to prepare the service request 170.

ML models repository 140 may store the ML models in a flat file system. In some embodiments, the ML models repository may be a cloud-based file system (e.g., Amazon S3). The ML models repository 140 may maintain different versions of the ML models trained using different sets of data. The selection of relevant model from different versions of an ML model may be determined based on the user information 131 and user preferences 132.

The travel engine 110 generates the virtual network 160 specifically for the user 190 by applying filters based on the travel patterns of the users of the travel optimization system 100. The virtual network 160 may include a list of service providers who can help resolve the query 150. The service request 170 generated by the travel engine 110 may be used in identifying the service providers included in the virtual network 160. In particular, the travel engine 110 may use database 130 to generate the virtual network 160 of service providers matching the service request 170. In some embodiments, the virtual network 160 may include links to a location containing lists of service providers. For example, the travel optimization system 100 may behave as a meta-search engine offering results from several search engine systems, with each having their own subset of search results, including service providers.

The identified additional information about the user 190 from the service mapper 111, and location determiner 112 may help update the service request 170 to include additional services or specify further filters on a service identified as part of the service request 170. For example, in one scenario, a patient looking for certain health care service providers may provide a certain location where the patient would prefer to have the service. In another scenario, the travel optimization system 100 may update the service request 170 based on a query (e.g., the query 150) for foot pain to include services for physical therapy, occupational therapist. The travel optimization system 100 may include podiatric service as an alternative service based on past health care information stored in the user information 131, indicating recent knee surgery.

The query (e.g., query 150) made by a user (e.g., the user 190) may only mention a general query and not mention a specific service. For example, the user 190 may send a query for a foot pain symptom resulting in service requests for both podiatric service and physical therapy generated by the travel optimization system 100 based on service map evaluated by service mapper 111. Based on the health record information present in the database 130, the travel optimization system 100 may generate a service request for occupational therapy as the user (e.g., user 190) had a recent workplace injury. In some embodiments, the travel optimization system 100 may generate a service request to override the user service request. If the user rejects the results of the overridden service requests, the travel optimization system 100 may then generate the results for the original service request. Such interactions by a user with the service request results may help travel engine 110 of travel optimization system 100 in generating future service requests.

The ML models repository 140 may include models for different factors in determining a virtual network. For example, in healthcare practice, the ML models may include a model of health care providers based on travel distance, and another model to help match the specializations of a health care providers to the symptoms shared by a patient in a query. The ML models repository 140 may include models to help determine the weight to be given to these different models when identifying service providers.

Travel optimization system 100 can be related to many different domains or fields of use. Descriptions of embodiments related to specific domains, such as healthcare, is not intended to limit the disclosed embodiments to those specific domains, and embodiments consistent with the present disclosure can apply to any domain that utilizes predictive modeling based on available user information.

The travel optimization system 110 may include a similarity engine 115 to identify similar users to the user 190 sending the query 150. Similarity engine 115 may communicate with database 130 to identify other users similar to a user (e.g., the user 190) sending a query (e.g., the query 150) to the travel optimization system 100. The similarity engine 115 may identify similar users based on the similarity of preferences of a set of other users and the user. The similarity engine 115 identified similar user's travel patterns in the location 182 and making queries related to the type of service 181 may be used in determining the optimal travel distance based service providers for resolving the query 150 sent by the user 190. The usage of similarity engine is described in FIG. 7 and FIG. 8.

Figure 2:
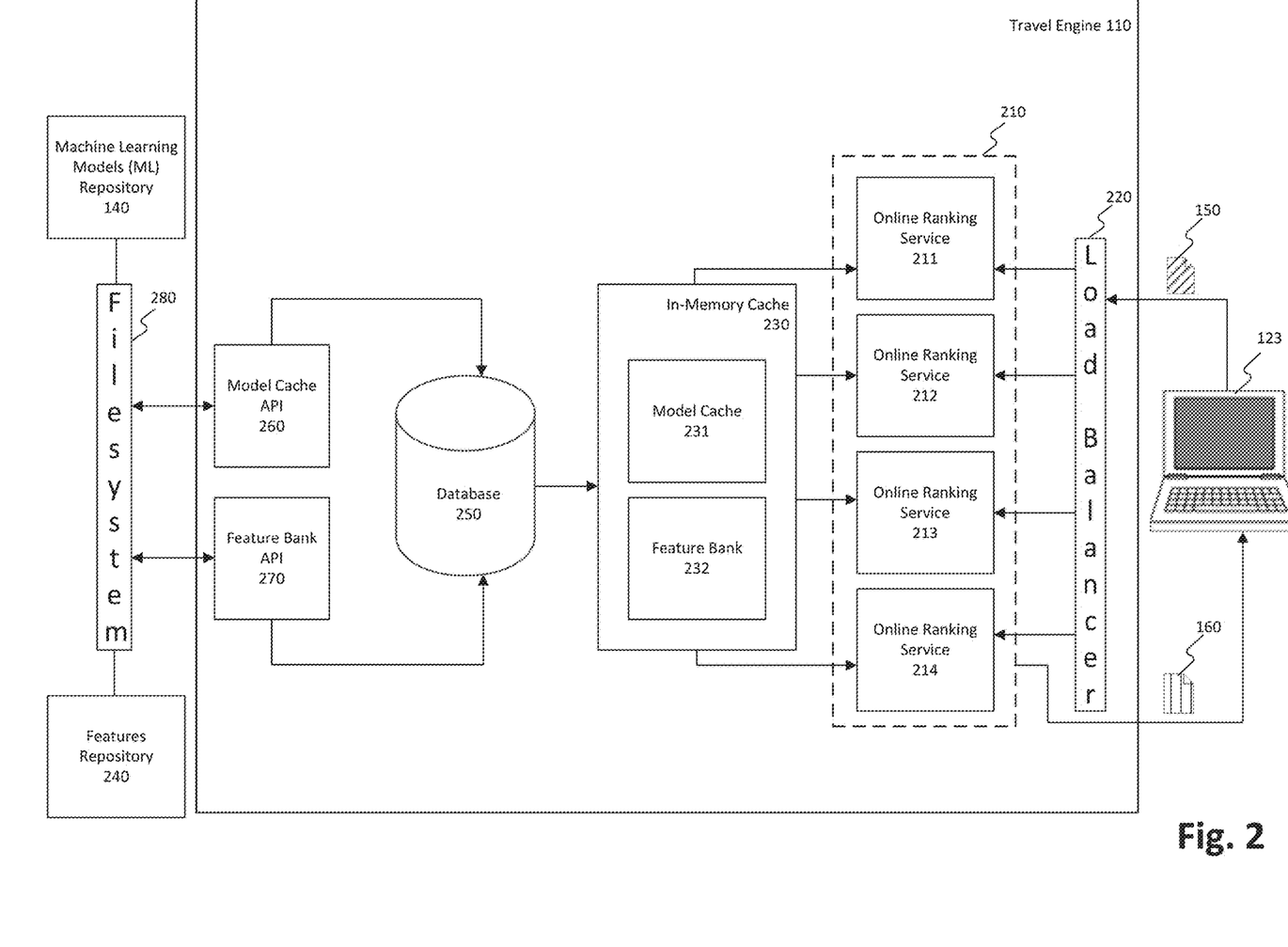
FIG. 2 is a block diagram of an exemplary travel engine of a travel optimization system of FIG. 1, according to some embodiments of the present disclosure.

FIG. 2 is a block diagram of an exemplary travel engine 110 of a travel optimization system 100 of FIG. 1, according to some embodiments of the present disclosure. As shown in FIG. 2, the internals of an exemplary travel engine 110, which includes an online ranking service 210 may help in preparing a virtual network (e.g., the virtual network 160) in response to a query (e.g., the query 150). Preparation of the virtual network 160 may include ordered listing and grouping of service providers.

As shown in FIG. 2, the travel engine 110 may comprise the online ranking service 210 to help determine the ranked order of the service providers determined to be part of a virtual network (e.g., the virtual network 160) of service providers shared with a user (e.g., the user 190). The online ranking service 210 may be replicated multiple times across multiple computers of a cloud computing service (not shown in the figure). The multiple instances 211-214 of online ranking service 210 may help with handling multiple users' queries simultaneously. The travel optimization system 100 (not shown in the figure) may receive the query 150 and may delegate the online ranking service 210 to help determine the virtual network 160.

The travel engine 110 may also include a load balancer 220 to manage load of users' queries sent to the online ranking service 210. Load balancer 220 may manage the users' query load by algorithmically selecting an online ranking service instance of online ranking service instances 211-214. For example, the load balancer 220 may receive the query 150 from the device 123 and forward it to the online ranking service instance 211. In some embodiments, the load balancer 220 may go through a round-robin process to forward the user queries to online ranking service instances 211-214. In some embodiments, the online ranking service instances 211-214 may each handle different types of user queries. The type of query may be determined by the load balancer 220.

The ranking method followed by online ranking service 210 may depend on the determined type of the query 150. In some embodiments, the ranked results generated by a set of online ranking service instances may be combined together by another set of online ranking service instances. For example, an online ranking service instance may rank based on the quality of healthcare provided, and another instance may rank based on the efficiency of the health care provider, and a third online ranking service may create composite ranks based on the ranking of service providers based on quality and efficiency.

The online ranking service 210 may utilize ML models to rank service providers. The online ranking service 210 may obtain the service providers through a set of ML models in ML models repository 140 and then rank them using another set of ML models in the ML models repository 140. The ML models used for processing the identified service providers may reside in an in-memory cache 230 for quick access. The ML models in the in-memory cache 230 may be pre-selected or identified based on a query (e.g., the query 150) sent by a user (e.g., the user 190). The travel engine 110 may include a model cache 231 to manage the ML models in the in-memory cache 230. In some embodiments, the model cache 231 may manage the models by maintaining a lookup table for different types of ML models. The model cache 231 may maintain and generate statistics about the ML models in in-memory cache 230. In some embodiments, the model cache 231 may only manage copies of models upon a user request. The model cache 231 may only include a single copy of each model in the in-memory cache 230. In some embodiments, the model cache 231 may also include multiple instances of the same ML models trained with different sets of data present in the database 130.

The online ranking service 210 may also utilize features used to identify the occurrence of certain events in user information 131 to help generate a virtual network. The occurrences of certain events may describe the state of the user and may help in predicting potential future events occurrence. The travel engine 110 may also store features used in predicting future events in feature bank 232. The online ranking service 210 may use the features in the feature bank 232 as input to ML models in model cache 231 to predict best suited service providers to be included in the virtual network 160. The features in the feature bank 232 may also help in selecting ML models in model cache 231 for determining the order of the service providers. The list of service providers being ordered may be determined by travel engine 110 (not shown in the figure). Online ranking service 210 may request travel engine 110 to identify the service providers prior to ordering the filtered set of service providers.

ML models in the in-memory cache 230 may be regularly copied from a key-value pair database 250 containing the trained ML models of ML models repository 140. Database 250 may access ML models in the ML models repository 140 using a model cache API 260. In some embodiments, the ML models repository 140 may be part of a file system 280. Database 250 may access ML models in ML models repository 140 to train the model at regular intervals. In some embodiments, database 250 may access the ML models repository 140 to identify new features of a user based on the observed features currently residing in features repository 240. Database 250 may access the observed featured in the features repository 240 using feature bank API 270. Database 250 supplies the trained ML models and features determined using ML models to the in-memory cache 230 to be managed by model cache 231 and feature bank 232, respectively. The accessed features and ML models residing in database 250 and in-memory cache may be utilized by both online ranking service 210 and other services that are part of the travel optimization system 100.

Figure 3:
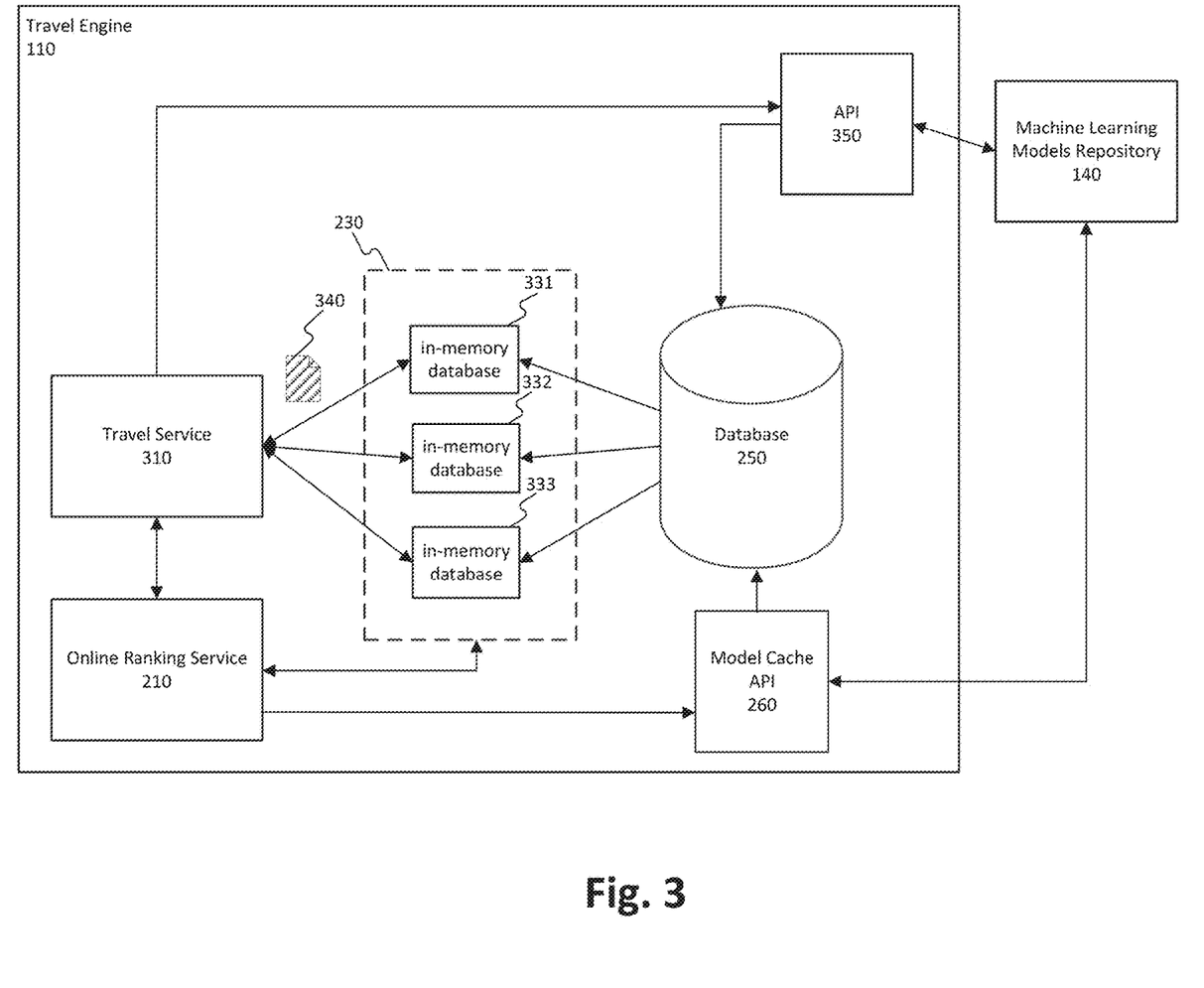
FIG. 3 is a block diagram of an exemplary travel engine of a travel optimization system of FIG. 1, according to some embodiments of the present disclosure.

FIG. 3 is a block diagram of an exemplary travel engine 110 of a travel optimization system 100 of FIG. 1, according to some embodiments of the present disclosure. As shown in FIG. 3, different services within the travel engine 110 may interact with each other and other components of the travel optimization system 100. The travel engine 110 may comprise a travel service 310 in addition to the online ranking service 210 to aid in the preparation of the virtual network 160 in response to a query 150. The travel service 310 may conduct predictive analysis for the service requests using identified ML models. The predictive analysis may include optimization of travel distance and popularity of the service providers identified ML models in preparing the virtual network. The online ranking service 210 and the travel service 310 may share components of the travel engine when communicating with ML models repository 140.

As shown previously in FIG. 2, travel engine 110 may retrieve the ML models in ML models repository 140 and store them in the database 250. The travel engine 110 may then select a few to be included in the in-memory cache 230. As shown in FIG. 3, travel service 310 in the travel engine 110 may access the retrieved ML models through in-memory cache 230, similar to the online ranking service 210. In some embodiments, the travel service 310 may request online ranking service 210 to help access the ML models in the in-memory cache 230. The travel service 310 may access the ML models repository 140 using an API 350. In some embodiments, travel service 310 may use model cache API 260 to retrieve ML models in the ML models repository 140. The access to the ML models repository 140 via the API 350 may result in the evaluation of the relevance of the models for the generated service request. Upon identification of relevant ML models, API 350 may send the ML models to a quick access database 250 (e.g., a key-value pair database such as Casandra).

As illustrated in FIG. 3, database 250 may copy the selected ML models to an in-memory cache 230. The in-memory cache 230 may be a cluster of in-memory databases 331-333 (e.g., Redis database) to handle multiple predictive analysis requests simultaneously. The cluster of in-memory databases 331-233 may be storing different sets of ML models as per service requests provided by the travel service 310. In some embodiments, a single database in the cluster of in-memory databases 331-233 may store related or similar ML models.

Figure 4:
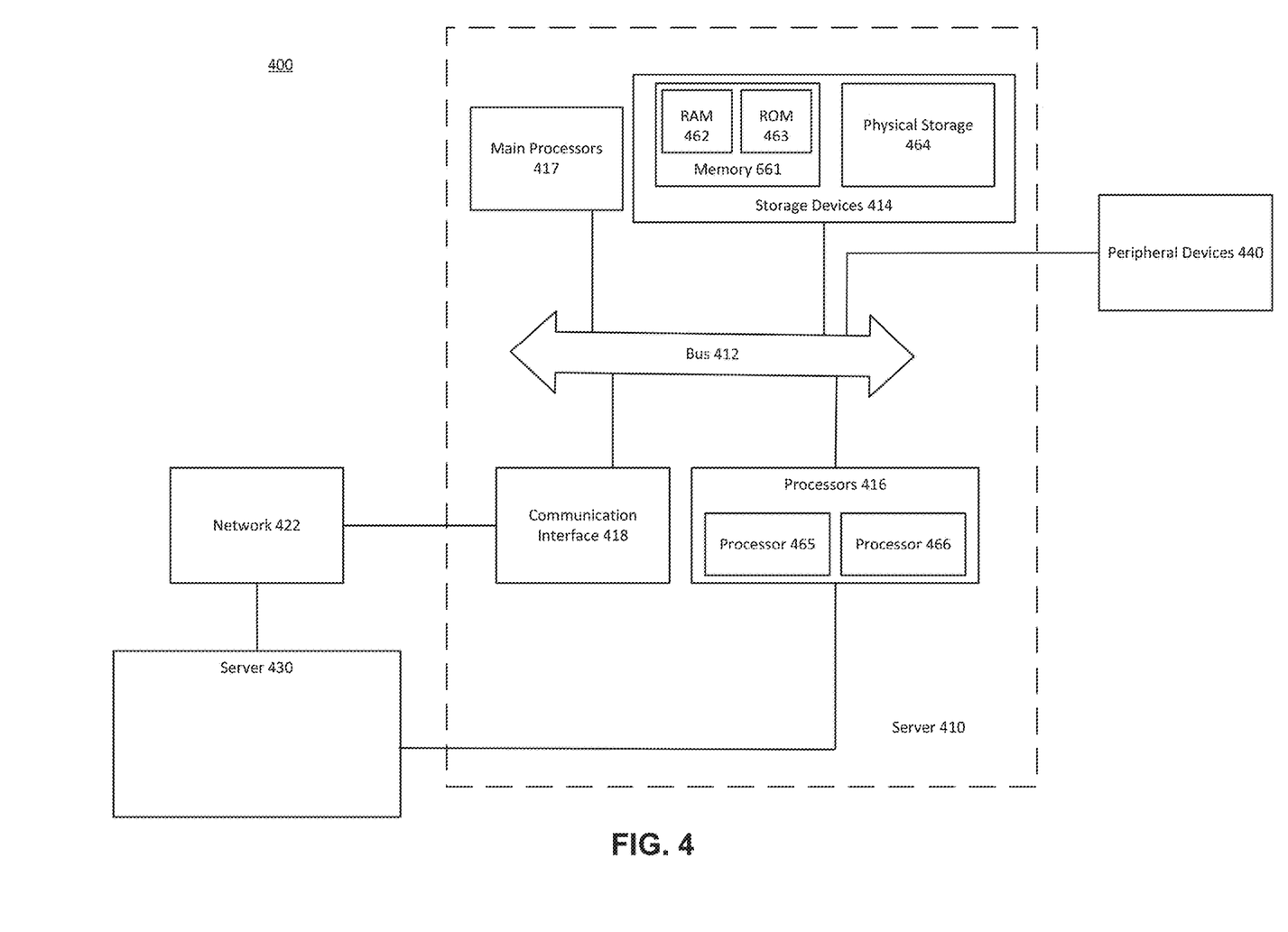
FIG. 4 illustrates a schematic diagram of an exemplary server of a distributed system, according to some embodiments of the present disclosure.

FIG. 4 illustrates a schematic diagram of an exemplary server of a distributed system, according to some embodiments of the present disclosure. According to FIG. 4, server 410 of distributed system 400 comprises a bus 412 or other communication mechanisms for communicating information, one or more processors 416 communicatively coupled with bus 412 for processing information, and one or more main processors 417 communicatively coupled with bus 412 for processing information. Processors 416 can be, for example, one or more microprocessors. In some embodiments, one or more processors 416 comprises processor 465 and processor 466, and processor 465 and processor 466 are connected via an inter-chip interconnect of an interconnect topology. Main processors 417 can be, for example, central processing units ("CPUs").

Server 410 can transmit data to or communicate with another server 430 through a network 422. Network 422 can be a local network, an internet service provider, internet, or any combination thereof. Communication interface 418 of server 410 is connected to network 422, which can enable communication with server 430. In addition, server 410 can be coupled via bus 412 to peripheral devices 440, which comprises displays (e.g., cathode ray tube (CRT), liquid crystal display (LCD), touch screen, etc.) and input devices (e.g., keyboard, mouse, soft keypad, etc.).

Server 410 can be implemented using customized hardwired logic, one or more ASICs or FPGAs, firmware, or program logic that in combination with the server causes server 410 to be a special-purpose machine.

Server 410 further comprises storage devices 414, which may include memory 461 and physical storage 464 (e.g., hard drive, solid-state drive, etc.). Memory 461 may include random access memory (RAM) 462 and read only memory (ROM) 463. Storage devices 414 can be communicatively coupled with processors 416 and main processors 417 via bus 412. Storage devices 414 may include a main memory, which can be used for storing temporary variables or other intermediate information during execution of instructions to be executed by processors 416 and main processors 417. Such instructions, after being stored in non-transitory storage media accessible to processors 416 and main processors 417, render server 410 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and an EPROM, a FLASH-EPROM, NVRAM, flash memory, register, cache, any other memory chip or cartridge, and networked versions of the same.

Various forms of media can be involved in carrying one or more sequences of one or more instructions to processors 416 or main processors 417 for execution. For example, the instructions can initially be carried out on a magnetic disk or solid-state drive of a remote computer. The remote computer can load the instructions into its dynamic memory and send the instructions over a telephone line using a modem. A modem local to server 410 can receive the data on the telephone line and use an infra-red transmitter to convert the data to an infra-red signal. An infra-red detector can receive the data carried in the infra-red signal and appropriate circuitry can place the data on bus 412. Bus 412 carries the data to the main memory within storage devices 414, from which processors 416 or main processors 417 retrieves and executes the instructions.

The travel optimization system 100 one or more of its components may reside on either server 410 or 430 and may be executed by processors 416 or 417. In some embodiments, the components of the travel optimization system 100 may be spread across multiple servers 410 and 630. For example, the online ranking service instances 211-214 may be executed on multiple servers. Similarly, the in-memory database instances 331-333 may be maintained by multiple servers 410 and 430.

Figure 5:
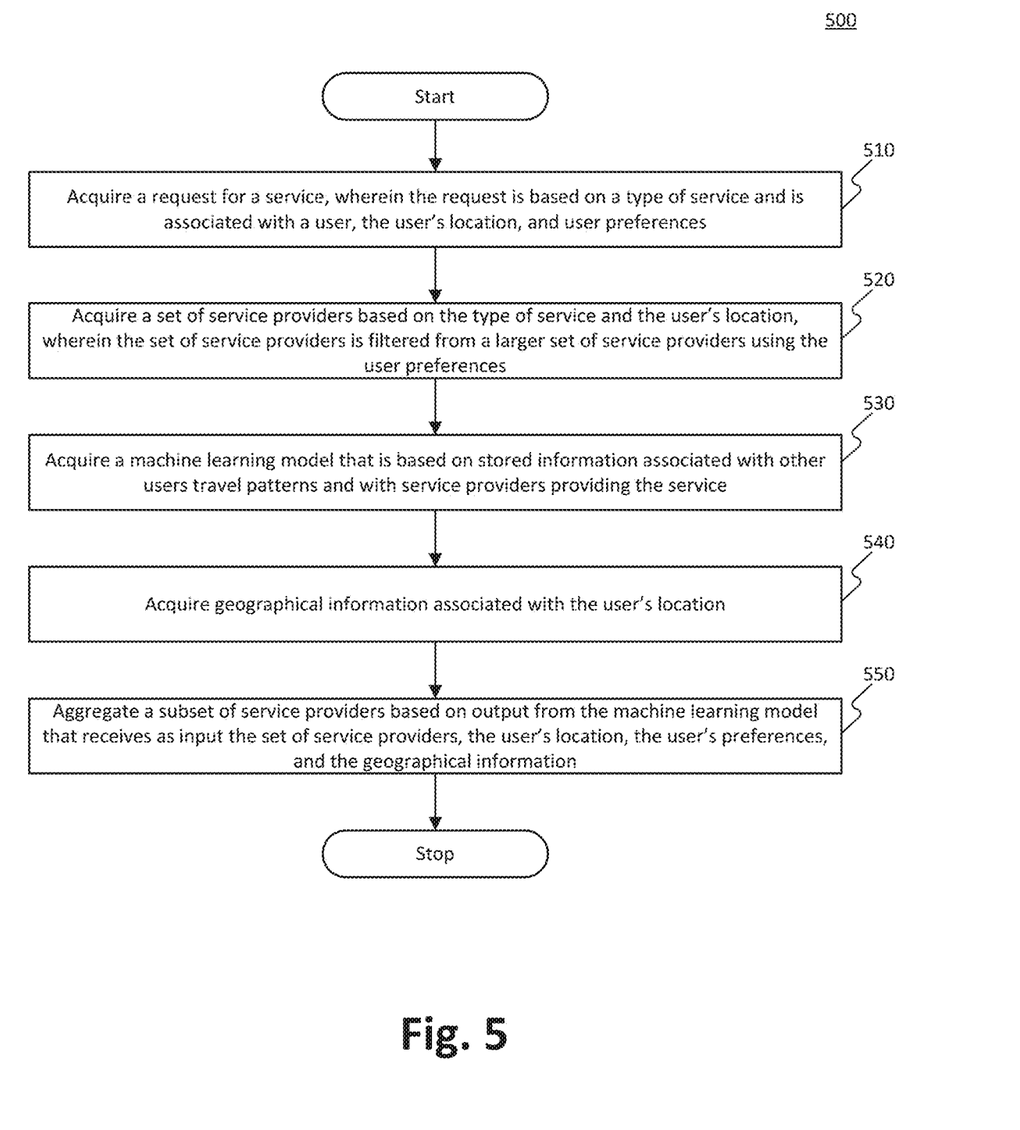
FIG. 5 is a flowchart showing an exemplary method for travel optimized service providers, according to some embodiments of the present disclosure.

FIG. 5 is a flowchart showing an exemplary method for determining service providers based on a location, according to some embodiments of the present disclosure. The steps of method 500 may be performed by the travel optimization system 100 for purposes of illustration. It will be appreciated that the illustrated method 500 can be altered to modify the order of steps and to include additional steps.

In step 510, the travel optimization system 100 may receive a query (e.g., the query 150) seeking a solution to resolve the query. The query 150 may be a service request or may be transformed by the travel engine 110 of the travel optimization system 100 to a service request (e.g., the service request 170). The travel optimization system 100 upon receiving the query 150 from the user 190 may generate the service request 170 using the previously stored user information 131 and user preferences 132. The service request 170 generated by the travel engine 110 may be based on the type of service 181. The type of service may be determined from the query or past information about the user 190 stored in the user information 131. The service request 170 may also depend on location (e.g., the location 182) supplied explicitly by the user 190 as part of the query 150 or may be provided by the device 123 used by the user 190 to send the query 150. In an example scenario, the user 190 may post a query for back pain to the travel optimization system 100 through device 123. The user 190 provided query may include a location preference details for a service provider within 15 miles of a certain zip code to address the back pain. The user 190 may include a preference for a weekend visit that is stored in the user preferences 132 records in the database 130. The user 190 preferences are retrieved from the database 130 while generating the service request 170. The travel engine 110 may utilize the service mapper 111 to determine physical therapy, chiropractic service, and orthopedic service as the services to address the back pain query. The service request 170 may include all the services physical therapy, chiropractic service, and orthopedic service and the location details provided by the user 190.

In step 520, the travel engine 110 of travel optimization service 100 may utilize the travel service 310 to acquire a set of service providers 340 by executing models residing in in-memory databases 331-333 of the in-memory cache 230. The ML models in the in-memory cache 230 are provided as input the type of service 181 and the preferred location 182 determined by service mapper 111 and location determiner 112. In some embodiments, the ML models selected from ML models repository 140 itself is based on the type of service 181 and other details provided (e.g., the preferred location 182, the user preferences 132) as input to ML models in in-memory cache 230. The type of service 181 may be a set of types of services. In some embodiments, the set of types of services may be related to each other. In the example scenario, the query 150 for back pain may result in travel engine 110 determining the types of services to be physical therapy, chiropractic service, and an orthopedic service. The identified types of services may be used for selecting different ML models for identifying service providers. The types of service may be mapped one to one to the ML models related to the type of service. In some embodiments, the types of service may have many to many relationships between a set of types of services and the ML models. For example, the physical therapy service may be associated with both a physiotherapist model and an occupational therapist model. Alternatively, both physical therapy and chiropractic services may be associated with a single manual therapy model. The model selection may also be determined by the user preferences 132. For example, the user 190 may have set a preference for only surface care and not any invasive care resulting in any ML models associated with physician service being filtered. The identified models in this step are executed with service request 170 as input to generate a set of service providers. In the example scenario, the execution of manual therapy, orthopedics models generate a set of service providers providing physical therapy, occupation therapy, chiropractic service, and orthopedic service.

In step 530, the travel engine 110 may access another ML model in ML models repository 140 that take service providers identified by ML models for different services in step 520 as input as well as travel patterns of other users of travel optimization system 100 stored in database 130. The travel patterns may showcase the amount distance traveled for different types of services by the users accessing the travel optimization system 100. The travel patterns may vary based on the type of service and the location. In the example scenario, the users who utilize travel patterns for alternative care from chiropractors and physical therapists are considered outliers and may be ignored. But the users traveling farther distances for orthopedic surgeons may be considered because of the severity of the back injury. If the user 190 making the query was asking for a service in a rural location, then the travel patterns of users traveling farther may be considering due to the low density of population and health care services.

In step 540, the travel engine 110 may acquire geographical information associated with the user's 190 preferred location (e.g., the location 182). The location may be provided along with the query (e.g., the query 150) or may be a default value saved in the database 130. The location 182 in query 150 may be provided by the user or may be determined from a GPS chipset in the device (e.g., the user device 123) used by user 190 to submit the query 150 to the travel optimization system 100. The travel optimization system 100 may acquire geographical information 183 associated with the location 182 by using a third party service. The travel engine 110 may send a request to remote mapping service 125 to access geographical information 183, including landmarks and transportation details.

In step 550, the travel engine 110 may request for execution of the ML model identified in step 530. The ML model from step 530 may be supplied as input the set of service providers identified in step 520, the location 182 associated with the user 190, and the geographical information 183. The ML model upon execution may generate a penalty score based on the travel distance from location 182 to the service providers. The penalty may be optimized for the quality of service information stored in user information 131. In the example scenario, the service providers who are on the opposite side of a body of water (e.g., such as a bay) may be presented with a higher penalty due to one single route of travel on a bridge. The same penalty may be reduced due to the user location being a rural location with less availability of service providers.

Figure 6:
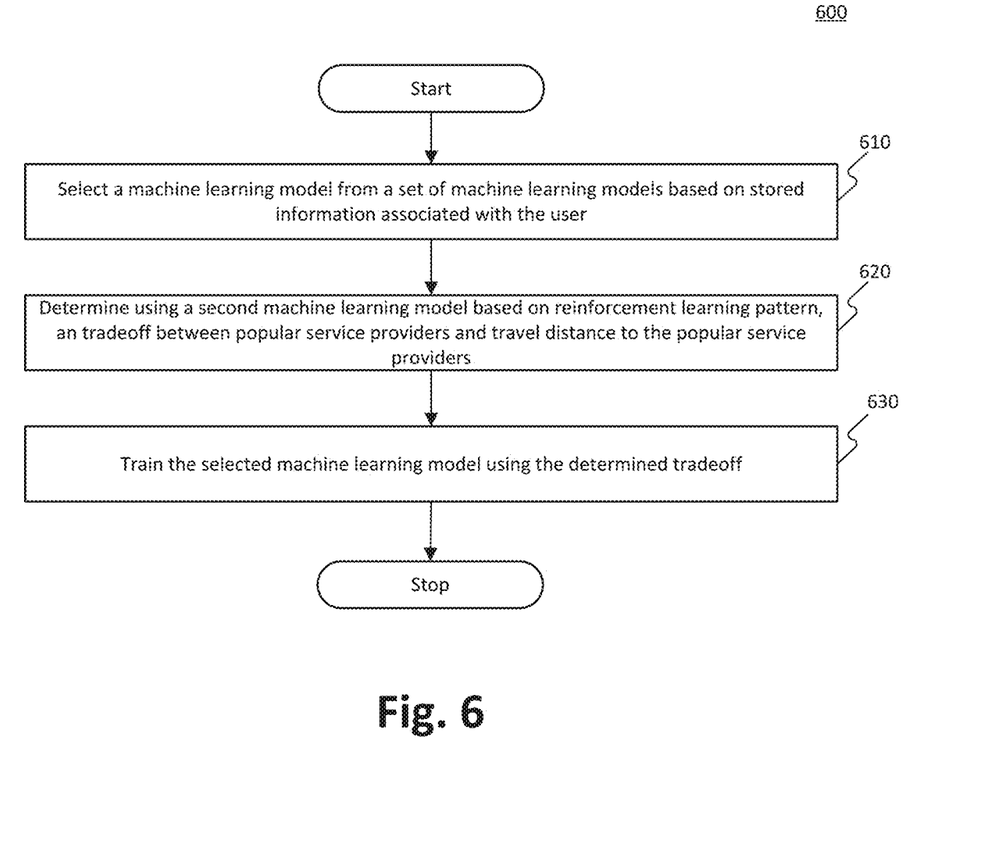
FIG. 6 is a flowchart showing an exemplary method for building a machine learning model for identifying relevant service providers, according to some embodiments of the present disclosure.

FIG. 6 is a flowchart showing an exemplary method for building an ML model for identifying the relevant service providers with optimized travel distance, according to some embodiments of the present disclosure. The steps of method 600 may be performed by the travel optimization system 100 for purposes of illustration. It will be appreciated that the illustrated method 600 can be altered to modify the order of steps and to include additional steps.

In step 610, the travel engine 110 may select an ML model from the ML models repository 140 based on information stored in the user information 131. The selected ML model may be used in step 530 of method 500 to identify a relevant subset of service providers (as described in FIG. 5) from a complete list of available service providers. In an example scenario, the user 190 making a back pain query and wanting relevant service providers to resolve the query may need method 600 to build the ML model, which can identify the relevant service providers identified in method 500.

In step 620, the travel engine 110 may identify an ML model from ML models repository 140 for determining tradeoff optimization between the popularity of a service provider and the travel distance to the service provider from the location 182. The identified ML model may be implemented using a reinforcement learning pattern (e.g., multi-armed bandit model). The service providers from the location 182 may provide service of a type different from the type of service 181 associated with query 150 and identified in method 500.

In step 630, the travel engine 110 may train the selected ML model in step 610 using the determined tradeoff optimization in step 620. The selected ML model is supplied with, via the database 130, other users' travel patterns that meet the tradeoff optimization requirements. The travel patterns not within the threshold of tradeoff between the popularity of the service provider and the travel distance may not be used in training the model.

Figure 7:
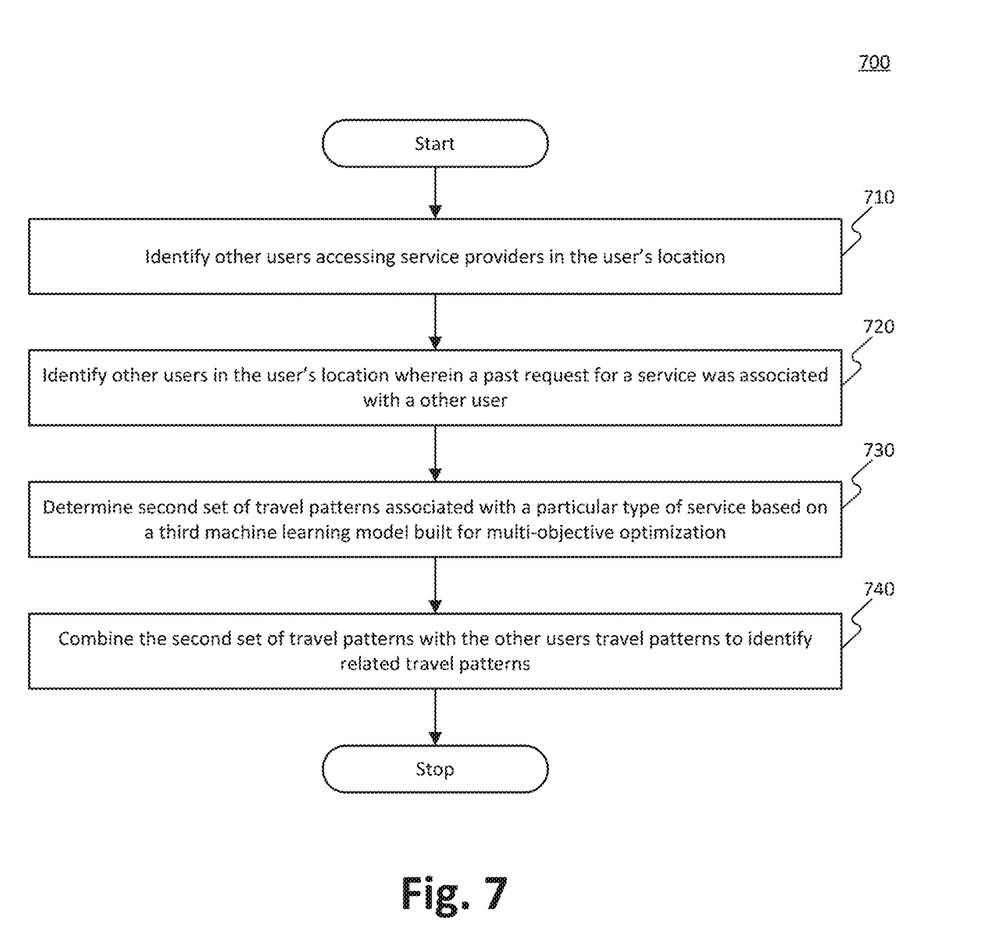
FIG. 7 is a flowchart showing an exemplary method for identifying a machine learning model based on travel patterns of users of the travel optimization system of FIG. 1 and other stored, according to some embodiments of the present disclosure. information

FIG. 7 is a flowchart showing an exemplary method for identifying a machine learning model based on users' travel patterns and other stored information in database 130, according to some embodiments of the present disclosure. The steps of method 700 may be performed by the travel optimization system 100 for purposes of illustration. It will be appreciated that the illustrated method 700 can be altered to modify the order of steps and to include additional steps.

In step 710, the travel engine 110 may identify other users accessing service providers determined by method 500 in step 520 (as described in FIG. 5) in the user's location (e.g., the location 182). In some embodiments, the identified other users may need to be similar to the user 190 making the query 150 to the travel optimization system 100. The similarity of the other users to the user 190 may be determined by the similarity engine 115 based on the preferences of the other users, and the user preferences 132 of the user 190.

In step 720, the travel engine 110 may identify additional users in the user's location 182 based on a past request for a service that may match the current service request 170. The additional users identified in this step may be different from the other users identified in step 710. In some embodiments, the other users from both steps 710 and 720 may have some overlapping users.

In step 730, the travel engine 110 may determine a second set of travel patterns associated with a particular type of service (e.g., the type of service 181) identified in step 510 of method 500 (as described in FIG. 5). The particular type of service 181 associated with the query to the travel optimization system 180 may be associated with several service providers and several users with different travel plans visiting those service providers identified in step 510 in the past. The travel engine 110 may determine a set of travel patterns from these travel plans using a third ML model. The third ML model may be present in ML models repository 140. The third ML model may be built for multi-objective optimization (e.g., Pareto multi-objective optimization).

In step 740, travel engine 110 may combine the second set of travel patterns identified in step 730 with the other users' travel patterns determined in method 600 for training an ML model for identifying relevant service providers. The travel patterns from method 600 are associated with the other users similar to the user making the query to the travel optimization system 100, and the patterns determined in step 730 of the method 700 are associated with the service. The user 190 relations to the other users in the location 182 and the type of service 181 are reflected in the combined set of travel patterns. The travel engine 110, as part of the combination process, may identify related travel patterns. The related travel patterns may achieve the multi-objective meeting certain thresholds.

Figure 8:
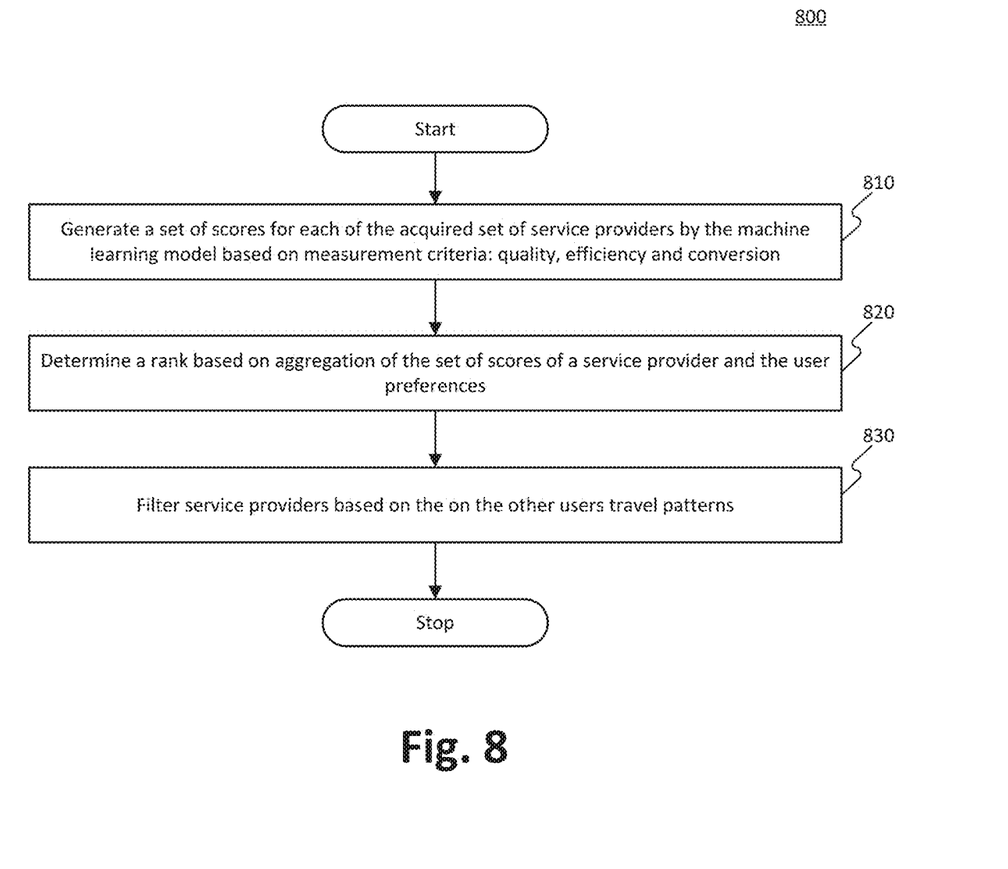
FIG. 8 is a flowchart showing an exemplary method for generating a list of service providers optimized for travel, according to some embodiments of the present disclosure.

FIG. 8 is a flowchart showing an exemplary method for generating a list of service providers optimized for travel distance, according to some embodiments of the present disclosure. The steps of method 800 may be performed by the travel optimization system 100 for purposes of illustration. It will be appreciated that the illustrated method 800 can be altered to modify the order of steps and to include additional steps.

In step 810, the online ranking service 210 may generate a set of scores for each of the acquired set of service providers identified by method 500. The online ranking service 210 may generate the set of scores using the ML model trained in method 600. The ML model may be accessed from in-memory cache 230. The scores may be generated based on certain measurement criteria such as quality of service, efficiency, and conversion. The measurement criteria may be evaluated using user information 131 stored in database 130 for all the users using the service of the service providers identified by method 500.

In step 820, the online ranking service 210 may determine a rank based on an aggregation of the set of scores of a service provider and the user preferences. The online ranking service 210 may aggregate the set scores by adding the scores. In some embodiments, the scores based on different measurement criteria may be multiplied by a percentage factor each score may contribute to the total score. The factors may be determined based on user information 131 and user preferences 132.

In step 830, the travel engine 110 may filter the service providers identified in method 500 by travel optimization system 100 based on the other users' travel patterns. The other users may be users who used the service providers. In some embodiments, other users similar to the user 190 are the only user considered for this step. The similarity of the users may be determined using similarity engine 115.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks Any combination of one or more computer readable medium(s) may be utilized. The computer readable medium may be a non-transitory computer readable storage medium. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations for example embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable medium including instructions that are executable by one or more processors to cause a system to perform a method for determining a virtual network based on a location, the method comprising:
    acquiring a request for a service, wherein the request is based on a type of service and is associated with a user, the user's location, and user preferences;
    acquiring a set of service providers based on the type of service and the user's location, wherein the set of service providers is filtered from a larger set of service providers using the user preferences, wherein the type of service is used to select one or more machine learning models that take the user's location and the user preferences as input to predict service providers;
    acquiring a first machine learning model of the one or more machine learning models, wherein the first machine learning model is based on stored information associated with other users travel patterns and with service providers providing the service, wherein the first machine learning model is trained on tradeoff optimization between popular service providers and travel distance to the popular service providers and is determined using a second machine learning model based on reinforcement learning pattern;
    acquiring geographical information associated with the user's location; and
    aggregating a subset of service providers based on output from the first machine learning model that receives as input the set of service providers, the user's location, the user's preferences, and the geographical information.

2. The non-transitory computer readable medium of claim 1, wherein acquiring a first machine learning model further comprises:
    building the first machine learning model based on stored information associated with the user.

3. The non-transitory computer readable medium of claim 2, wherein building the first machine model comprises:
    selecting the first machine learning model from a set of one or more machine learning models based on stored information associated with the user;
    training the first machine learning model based on the other users travel patterns, wherein the travel patterns include tradeoff optimization between popular service providers and travel distance to the popular service providers.

4. The non-transitory computer readable medium of claim 1, wherein acquiring a first machine learning model that is based on stored information associated with other users travel patterns and with service provider providing service comprises:
    determining a second set of travel patterns associated with the type of service based on a third machine learning model built for multi-objective optimization; and
    combining the second set of travel patterns with the other users travel patterns to identify related travel patterns.

5. The non-transitory computer readable medium of claim 4, wherein the other users travel patterns further comprises:
    identifying one or more other users in the user's location wherein a past request for a service was associated with other user of the one or more other users.

6. The non-transitory computer readable medium of claim 5, wherein the other users travel patterns further comprises:
    identifying one or more other users accessing service providers in the user's location.

7. The non-transitory computer readable medium of claim 1, wherein the user's location is a location provided by the user.

8. The non-transitory computer readable medium of claim 1, wherein acquiring geographical information associated with the user's location comprises:
    sending a request to a remote mapping service to provide geographical information; and
    receiving landmarks and transportation details.

9. The non-transitory computer readable of claim 1, wherein aggregating a subset of service providers based on output from the machine learning model comprises:
    generating one or more scores for each of the acquired set of service providers by the machine learning model, wherein the one or more scores are based on measurement criteria; and
    determining a rank based on aggregated one or more scores of a service provider and the user preferences.

10. The non-transitory computer readable medium of claim 9, wherein the measurement criteria includes at least one of: quality, efficiency, or conversion.

11. The non-transitory computer readable medium of claim 1, wherein aggregating a subset of service providers based on output from the machine learning model comprises:
 filtering service providers based on the other users travel patterns.

12. A method performed by a system for determining a virtual network based on a location, the method comprising:
 acquiring a request for a service, wherein the request is based on a type of service and is associated with a user, the user's location, and user preferences;
 acquiring a set of service providers based on the type of service and the user's location, wherein the set of service providers is filtered from a larger set of service providers using the user preferences, wherein the type of service is used to select one or more machine learning models that take the user's location and the user preferences as input to predict service providers;
 acquiring a first machine learning model of the one or more machine learning models, wherein the first machine learning model is based on stored information associated with other users travel patterns and with service providers providing the service, wherein the first machine learning model is trained on tradeoff optimization between popular service providers and travel distance to the popular service providers, wherein the tradeoff optimization is determined using a second machine learning model based on reinforcement learning pattern;
 acquiring geographical information associated with the user's location; and
 aggregating a subset of service providers based on output from the first machine learning model that receives as input the set of service providers, the user's location, the user's preferences, and the geographical information.

13. The method of claim 12, wherein acquiring a first machine learning model further comprises:
 building the first machine learning model based on stored information associated with the user.

14. The method of claim 13, wherein building the first machine model comprises:
 selecting the first machine learning model from a set of one or more machine learning models based on stored information associated with the user;
 training the first machine learning model based on the other users travel patterns, wherein the travel patterns include tradeoff optimization between popular service providers and travel distance to the popular service providers.

15. The method of claim 12, wherein acquiring a first machine learning model that is based on stored information associated with other users travel patterns and with service provider providing service comprises:
 determining a second set of travel patterns associated with the type of service based on a third machine learning model built for multi-objective optimization; and
 combining the second set of travel patterns with the other users travel patterns to identify related travel patterns.

16. The method of claim 15, wherein the other users travel patterns further comprises:
 identifying one or more other users in the user's location wherein a past request for a service was associated with other user of the one or more other users.

17. The method of claim 12, wherein aggregating a subset of service providers based on output from the machine learning model comprises
 generating one or more scores for each of the acquired set of service providers by the machine learning model, wherein the one or more scores are based on measurement criteria; and
 determining a rank based on aggregated one or more scores of a service provider and the user preferences.

18. A travel optimization system comprising:
 one or more memory devices storing processor-executable instructions; and
 one or more processors configured to execute the instructions to cause the travel optimization system to perform:
  acquiring a request for a service, wherein the request is based on a type of service and is associated with a user, the user's location, and user preferences;
  acquiring a set of service providers based on the type of service and the user's location, wherein the set of service providers is filtered from a larger set of service providers using the user preferences, wherein the type of service is used to select one or more machine learning models that take the user's location and the user preferences as input to predict service providers;
  acquiring a first machine learning model of the one or more machine learning models, wherein the first machine learning model is based on stored information associated with other users travel patterns and with service providers providing the service, wherein the first machine learning model is trained on tradeoff optimization between popular service providers and travel distance to the popular service providers, wherein the tradeoff optimization is determined using a second machine learning model based on reinforcement learning pattern;
  acquiring geographical information associated with the user's location; and
  aggregating a subset of service providers based on output from the first machine learning model that receives as input the set of service providers, the user's location, the user's preferences, and the geographical information.

* * * * *